United States Patent
Landolt

(10) Patent No.: US 6,923,071 B2
(45) Date of Patent: Aug. 2, 2005

(54) APPARATUS FOR RATING A TORSION BAR

(76) Inventor: Gary A. Landolt, 355 Hillview Dr., Wood River, IL (US) 62095

( * ) Notice: Subject to any disclaimer, the term of this patent is extended or adjusted under 35 U.S.C. 154(b) by 0 days.

(21) Appl. No.: 10/649,281

(22) Filed: Aug. 27, 2003

(65) Prior Publication Data

US 2005/0044962 A1 Mar. 3, 2005

(51) Int. Cl.$^7$ ............................. G01N 3/22; G01N 3/26
(52) U.S. Cl. ........................................................ 73/847
(58) Field of Search ............................. 73/847, 11.05, 73/11.07, 1.11, 862.331

(56) References Cited

U.S. PATENT DOCUMENTS 4,561,580 A * 12/1985 Trail, Jr. ...................... 226/45
6,397,657 B1 * 6/2002 Kroll et al. ................. 73/11.05

OTHER PUBLICATIONS

"B R Motor Sports, 2003 Super Parts Catalog, two pages of advertising".

* cited by examiner

Primary Examiner—Max Noori
Assistant Examiner—Octavia Davis
(74) Attorney, Agent, or Firm—Polster, Lieder, Woodruff & Lucchesi, L.C.

(57) ABSTRACT

An apparatus for determining the spring rate of a torsion bar for an automotive vehicle includes a frame having two channels which cross between the ends of the frame. Each channel is configured to receive a torsion bar—one when a bar is to be twisted clockwise and the other when a bar is to be twisted counterclockwise. Mounted on the frame at its head end is an adjustable pneumatic cylinder having a piston which exerts a torque on the torsion bar through a long torque arm. At the tail end of the frame is a measuring unit against which a short torque arm that is connected to the opposite end of the bar bears, thus resisting the torque applied by the pneumatic cylinder and registering a force derived from the torque. A key engages the piston of the pneumatic cylinder to hold it in a predetermined extended position and the piston can be set to extend no farther than that position as well, all so that a known deflection corresponds to a force measured by the display. The piston at its center has a depression and the long torque arm has an adjusting screw, the end of which seats in the depression when the piston is retracted, thus establishing a fixed distance between the axis of the torsion bar and the end of the adjusting screw. That distance is then fixed, so as the piston moves to its extended positions the effective length of the long torque arm does not change.

24 Claims, 4 Drawing Sheets

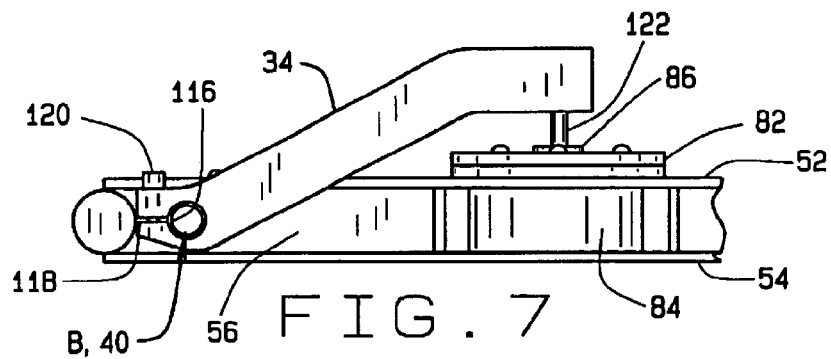
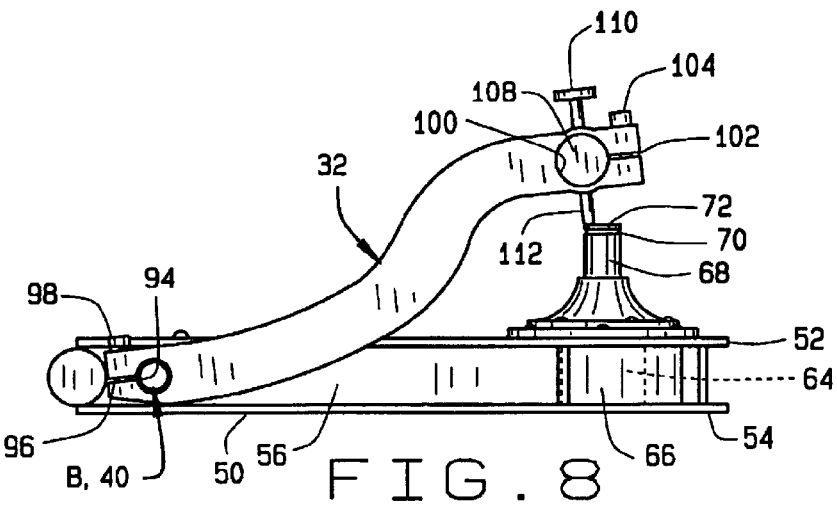
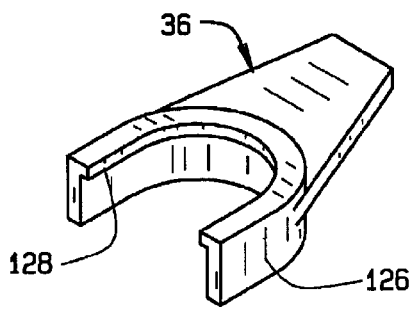
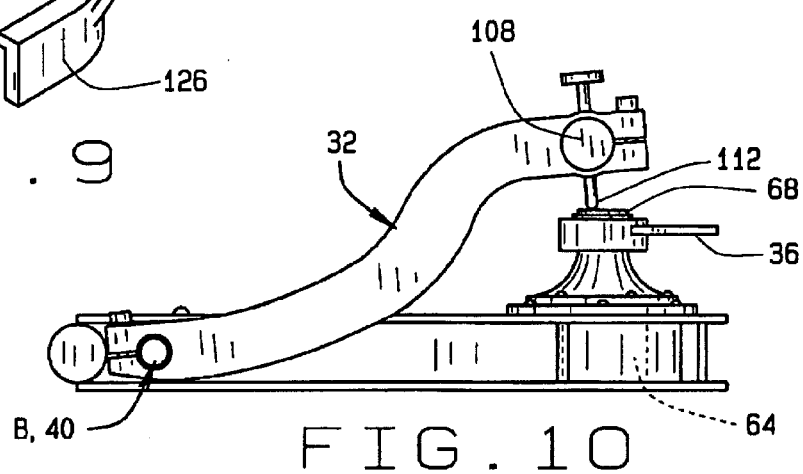

APPARATUS FOR RATING A TORSION BAR

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

This invention relates in general to measuring devices and more particularly to an apparatus for determining the rating of a torsion bar.

The handling characteristics of race cars depend to a measure on the stiffness of the suspension systems for such cars. Moreover, track conditions and configurations vary, each requiring a suspension system tailored to it. For example, dirt track races always proceed counterclockwise around an oval track, so all of the turns are left turns. Drivers prefer to stiffen suspensions at the left front and right rear wheels of their cars. This improves both control and traction.

The suspension system of a typical sprint car has four torsion bars—one for each wheel. The bars extend transversely across the vehicle, with two ahead of the front axle and two behind the rear axle. While the bars are traditionally classified by size, many drives prefer to classify them by rate, and one rate that has found acceptance is the amount of force required to deflect a torque arm at one end of a bar one inch. Thus, a bar rated at 235 lbs. would be stiffer than one rated at 197 lbs. Rates may vary among bars of the same size. Each torsion bar exerts a downwardly directed force on the axle near the wheel with which it is identified and an upwardly directed force on the frame of the car at the corner where the wheel is located, thus suspending much of the weight of the vehicle. The bars are accessible at the ends of the car and require little effort to remove and replace. Often a driver will replace an entire set of bars with a new set more suited for the conditions of a forthcoming race. However, before a driver replaces any torsion bar, he should know how it will react in the race car, and this depends on the spring rate for the bar.

Testing devices exist for comparing torsion bars of a set or in collection at a driver's disposal. Indeed, manufacturers of torsion bars sometimes apply ratings to them, but the ratings may not correlate to the ratings used or acquired elsewhere, and furthermore may not be accurate. In any event, the testing devices used by manufacturers are much too large to be used by individual drivers, particularly at the tracks where they race. Another testing device exists which is suitable for use in a shop, but is not easily transported to a track, and furthermore is expensive. Still another testing device is available which is small enough to transport to a track, but does not rate bars according to any recognized standard. Moreover, the devices currently available twist the bars in only one direction of rotation, but the rates of some bars vary, being of a magnitude in one direction of rotation that is different than the magnitude in the opposite direction.

BRIEF SUMMARY OF THE INVENTION

The present invention resides in an apparatus for determining the spring rate of a torsion bar. The apparatus includes a frame having two channels each of which is configured to receive a torsion bar. At one end of the frame is force applicator and at the other end is a measuring device. One torque arm extends between the force applicator and the channel in which a torsion bar is received and another torque arm extends between that channel and the measuring device. The invention also resides in an apparatus for determining the spring rate, with the apparatus including a frame and having a channel configured to receive a torsion bar and a force applicator at one end of the frame. A torque arm extends between the end of the channel and the force applicator for applying a torque to a torsion bar in the channel when a drive element of the force applicator moves from a retracted position to extended positions. The drive element has a depression in which a transfer element on the torque arm is initially seated, and thereafter secured so that when the drive element is extended, the moment arm formed by the torque arm remains constant.

BRIEF DESCRIPTION OF THE SEVERAL VIEWS OF THE DRAWINGS

FIG. 7 is a fragmentary end elevational view of the rating apparatus taken along line 7—7 of FIG. 3;

FIG. 8 is an end elevational view similar to FIG. 4, but showing the piston of the pneumatic cylinder extended to its fullest extent;

FIG. 9 is a perspective view of a set key forming part of the present invention; and FIG. 10 is an end elevational view similar to FIGS. 4 and 7, but showing the set key fitted to the piston of the pneumatic cylinder to extend the piston a prescribed distance.

Corresponding reference characters indicate corresponding parts throughout the several views of the drawings.

DETAILED DESCRIPTION OF INVENTION

Figure 1:
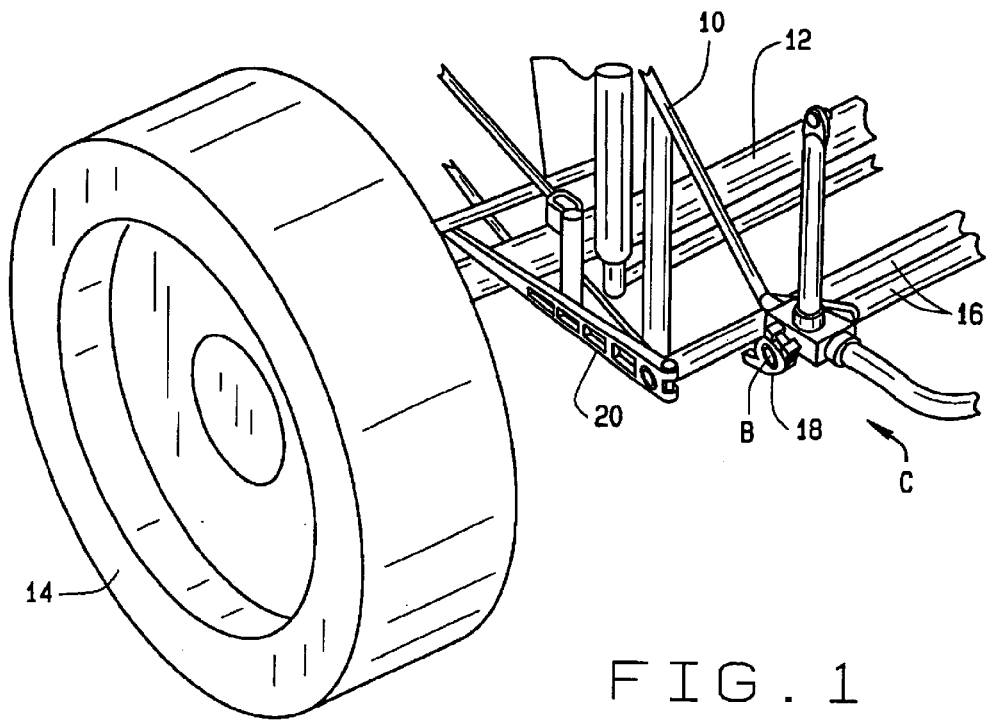
FIG. 1 is a fragmentary perspective view of a front corner of a sprint car, the torsion bars of which are rated with the apparatus of the present invention.
Figure 2:
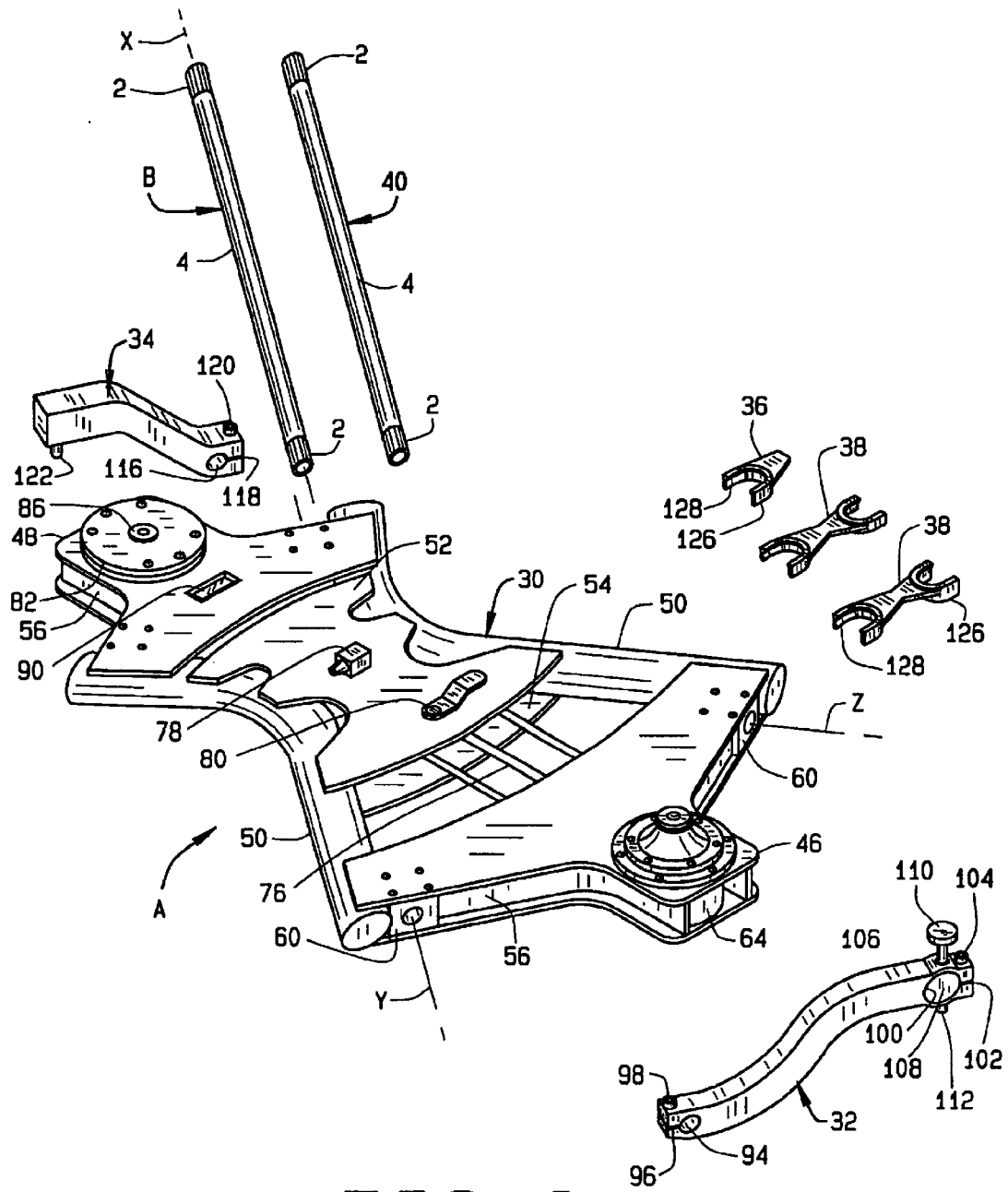
FIG. 2 is an exploded perspective view of the rating apparatus of the present invention and further illustrating one of the torsion bars rated with the apparatus.

Referring now to the drawings, an apparatus A (FIGS. 2 & 3) measures with considerable accuracy the spring rate of a torsion bar B which may be one of several bars B forming part of the suspension system of an automotive vehicle C (FIG. 1), such as dirt track sprint car. The apparatus A enables one to determine and compare the spring rates of all torsion bars B on the vehicle C, so that the vehicle C has a set of bars B that provide for optimum traction and control under the driving conditions anticipated.

Considering the bar B first, it has (FIG. 2) a spline 2 at each end and a cylindrical active region 4 located between the two splines 2. The two splines 2 and the active region 4 have a common center, it being an axis X. Typically, all the bars B in a set of bars B for the vehicle C will have splines 2 of the same diameter, but the diameters of the intervening active regions 4 will vary. Even so, the diameters of the active regions 4 will never exceed the diameter of the splines 2. The variance in the diameters of the active regions 4 imparts different spring rates to the bars B, those of greater diameter generally having higher spring rates than those of lesser diameter. One standard used to compare spring rates is the amount of force required to deflect the remote end of a 12-inch torque arm on the bar B one inch. For example, if 235 lbs applied twelve inches from the axis X of the bar B deflects the 12-inch torque arm one inch, the bar B has a rating of 235 lbs.—or more precisely 235 ft-lbs./in.

Basically, the vehicle C, when in the form of a sprint car, has (FIG. 1) a frame 10 located over solid axles 12 with wheels 14 at the ends of the axles 12. The frame 10 at each of its ends has a pair of tubes 16 which are located beyond the axle 12 at that end. Each tube 16 contains a torsion bar B, with the splines 2 on the bar B being located beyond the ends of the tube 16. Clamped around one spline 2 is a stop 18 which bears against the frame 10 and resists torque that is applied at the other end through a torque arm 20 which is clamped around the spline 2 at that other end. That torque arm 20 is connected to or bears against the nearby axle 12 adjacent to the wheel 14 to which the bar B transfers its portion of the suspended weight of the vehicle C.

Turning now to the testing apparatus A, it includes (FIGS. 2 & 3) a base 30 which is capable of receiving the torsion bar B such that the bar B can be twisted between its ends and the torque—or more accurately, the force component of the torque—required to twist it measured. The apparatus A also includes a long torque arm 32 through which torque is applied to the bar B that is received in the base 30 and a short torque arm 34 through which the applied torque is resisted. In addition, the apparatus A has a set key 36 which establishes a known deflection at the end of the long torque arm 32 and compensating keys 38 which compensate for variances between the length of the long arm 32 and the effective length of the torque arms 20 on the vehicle C. Finally, the apparatus A includes a calibration bar 40 which is similar to the bar B, but has a known spring rate determined independently of the apparatus A.

The base 30 includes (FIG. 2) a frame 44 having a head end 46 and a tail end 48. Along the sides of the frame 44 are tubular members 50 which neck inwardly between their ends 46 and 48, so that they flare outwardly toward the two ends 46 and 48. The two side members 50 are connected by upper plates 52 and lower plates 54 which are welded to the members 50, so that the members 50 together with the plates 52 and 54 impart considerable rigidity to the frame 44. The spacing between the tubular side members 50 is greatest at the head end 46, and here even more rigidity is imparted to the frame 44 by ribs 56 which fit between the upper and lower plates 52 and 54 and are welded to them. More ribs 56 fit between the upper and lower plates 52 and 54 at the tail end 48. Immediately inwardly from the ends of each side member 50, the space between the upper and lower plates 52 and 54 is occupied by a bushing 60 which is attached firmly to the plates 52 and 54. Each bushing 60 has a bore large enough to loosely receive the spline 2 on a torsion bar B. The bushings 60 are arranged in pairs, with the bushings 60 of each pair being at opposite corners of the frame 44. The bushings 60 of one pair align along an axis Y and the bushings 60 of the other pair align along an axis Z. The axes Y and Z intersect between the head end 46 and tail end 48 of the frame 44 and thus define a plane.

Figure 5:
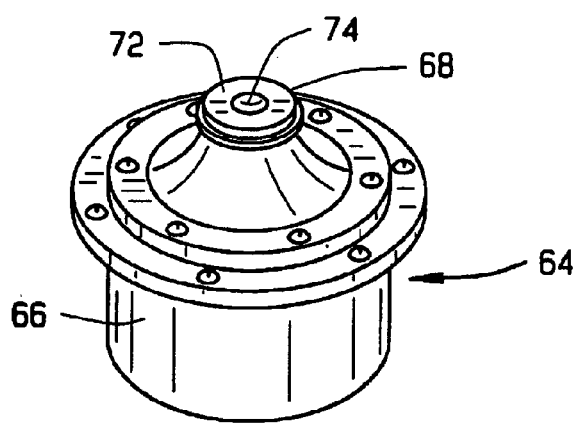
FIG. 5 is a perspective view of the pneumatic cylinder for the rating apparatus.
Figure 6:
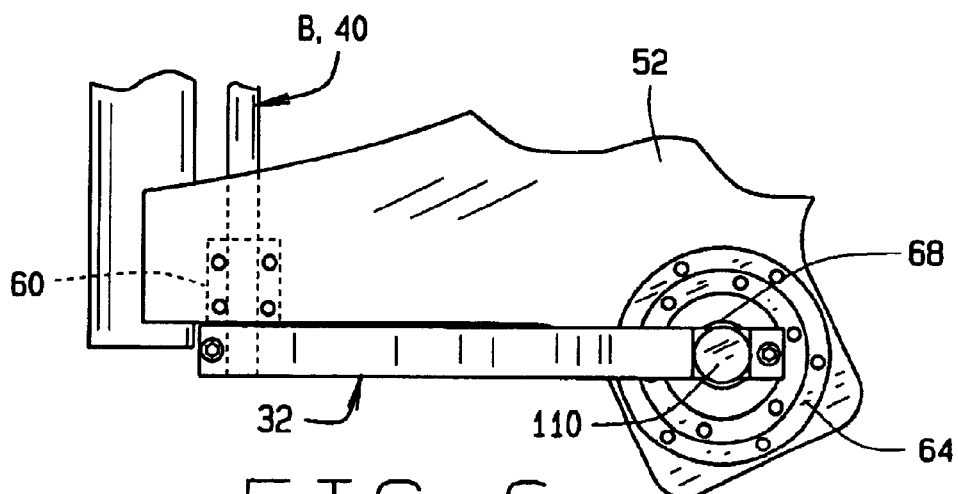
FIG. 6 is a fragmentary plan view of the rating apparatus taken along line 6—6 of FIG. 4.

The ribs 56 at the head end 46 of the frame 44 create a cradle which receives a force applicator which may take the form of an adjustable pneumatic cylinder 64. It has (FIG. 8) a barrel 66 which is attached firmly to the upper plate 52 of the frame 44 and rests on the bottom plate 54 and a piston 68 which rises out of the barrel 66 when pressurized air is admitted to the barrel 66 behind it. The piston 68 constitutes a drive element through which the cylinder 64 exerts a force on the long torque arm 32. The axis of the cylinder 64 lies perpendicular to the plane formed by the intersecting axes Y and Z, and the piston 68 moves along the cylinder axis between a retracted position and an extended position. In this regard, the piston 68 has a maximum extension of typically 1¼ in., but when rotated to a prescribed position, it will extend a lesser distance, in this instance 1 in. In that sense the cylinder 64 is adjustable. The piston 68 contains an annular groove 70 which opens out of its cylindrical side surface slightly below its upper end. It also has a top surface 72 which contains a depression 74 (FIG. 5) in its very center. Otherwise the top surface 72 is flat and perpendicular to the axis of the cylinder 64. The force exerted by the piston 68 is transferred through the top surface 72 which thus functions as a drive surface.

The barrel 66 of the pneumatic cylinder 64 is connected to an air line 76 (FIG. 2) through which pressurized air is admitted to it below the piston 68. The air line 76 originates at a quick-connect coupling 78 on the upper plate 52 of the frame 44, it being configured to connect with a source of pressurized air such as an air hose. The air line 76 passes through a manually-operated valve 80 also mounted on the top plate 52. When the valve 80 is closed, the barrel 66 of the pneumatic cylinder 64 is vented and the piston 68 assumes its retracted position within the barrel 66. However, when the valve 80 is opened, pressurized air flows through the line 76 to the barrel 66 of the cylinder 64 and drives the piston 68 to an extended position.

The ribs 56 at the tail end 48 of the frame 44 form another cradle which receives a measuring unit 82 (FIG. 7) including a barrel 84 which is fixed firmly to the frame 44 and a sensing element 86 which is exposed at the top of the barrel 84. When a downwardly directed force is applied to sensing element 86, the pressure of the hydraulic fluid in the barrel 84 increases. That pressure is reflected on a display 90 (FIG. 3) which is mounted on the frame 44 adjacent to the barrel 84 and is exposed through the upper plate 52 of the frame 44. The hydraulic fluid is for all intents and purposes incompressible, so the sensing element 86 does not move. While the display 90 actually reflects the pressure in the device, the number it registers represents an actual force in pounds that is correlated to the force exerted by the piston 68 of the cylinder 64 and transferred to the measuring unit 82 through the torsion bar B and the torque arms 32 and 34 on its ends.

The long torque arm 32 at one end has (FIG. 4) an internal spline 94 and a slit 96 leading away from the spline 94 to the end surface of the arm 32, so that the size of the spline 94 may be varied, although minutely. To effect this variance, the end of the torque arm 32 is fitted with a clamp screw 98 which passes through the slit 96. When the screw 98 is turned down, the spline 94 contracts. The spline 94, when expanded, which is the configuration that it naturally assumes, fits over the external spline 2 at either end of the torsion bar B. Thereupon, the clamp screw 98 is tightened to contract the spline 94 and clamp the splined end of the arm 32 snugly around the external spline 2 on the bar B. At its other end, the long torque arm 32 has a cylindrical bore 100 with a slit 102 leading away from it to the end surface of the arm 32. Here another clamp screw 104 extends through the arm 32 and passes through the slit 102. When turned down, the screw 104 contracts the bore 100 against the natural bias of the metal from which the arm 32 is made. The long arm 32 also has elongated openings 106 (FIG. 2) that lead into the bore 100 from the top and bottom of the arm 32 with their major axes extending longitudinally in the arm 32. The cylindrical bore 100, receives a cylindrical swivel 108 which fits loosely in the bore 100 when the clamp screw 104 is backed off, so that the swivel 108 will rotate, but is fixed tightly in the arm 32 when the screw 104 is tightened.

The swivel 108 supports an adjusting screw 110 (FIG. 8) which threads into it. Indeed, the screw 110 passes completely through the swivel 108 and also through the elongated openings 106 (FIG. 2) so that it projects both above and below the openings 106. At its upper end the screw 110 has a thumb wheel. Its lower end aligns with the top surface 72 on the piston 68 and is beveled, thus providing a tapered end 112 which is small enough to fit into the depression 74 in the top surface 72. Since the openings 106 that lead away from the bore 100 are elongated, the adjusting screw 110 can move to and fro in them. This affords a limited amount of rotation for the swivel 108 in the bore 100, assuming that the clamp screw 104 is backed off.

When the tapered end 112 of the adjusting screw 110 is in the depression 74 (FIG. 4) in the top surface 72 of the piston 68 and the piston 68 is retracted, the distance between the axis Y or Z of either pair of bushings 60 and the centerline of the screw 110 is a known distance, such as 12 in. Once the clamp screw 104 is tightened, that distance is maintained, even though the tapered end 112 of the clamp screw 104 may climb out of the depression 74 and onto the flat portion of the surface 72 surrounding it (FIG. 8). In this regard, the piston 68, as it extends, does not follow the arc transversed by the tapered end 112 of the screw 110. The small torque arm 34 at its one end has (FIG. 7) an internal spline 116 and a slit 118 leading from the spline 116 to the end surface of the arm 34. The spline 116 is contracted by a clamp screw 120 which passes through the end of the arm 34 including the slit 118 at that end. With the clamp screw 120 backed off, the spline 116 on the short arm 34 fits easily over and engages the spline 2 on either end of the torsion bar B. When the clamp screw 120 is turned down, it contracts the spline 116 and secures the short arm 34 firmly on the spline 2 of the torsion bar B. At its opposite end the short torque arm 34 has a nib 122 which bears against the sensing element 86 for the measuring unit 82. The distance between axis X of the bar B to which the arm 34 is fitted and the end of the nib 122 remains constant and is known.

Each of the keys 36 and 38 has (FIGS. 2 & 9) a U-shaped end 126 and a lip 128, which extends along the end 126 where it is directed inwardly along the margin of the end 126. The U-shaped end 126 is configured to fit around the piston 68 of the cylinder 64 with the lip 128 projected into the annular groove 70 in the piston 68, when, of course, the piston 68 is extended from the barrel 66. When the end 126 of any key 36 or 38 is so fitted to the extended piston 68 and the piston 68 is thereafter moved toward its retracted position, the key 36 or 38 limits the distance that the piston 68 can retract. Actually, each key 36 and 38, when fitted to the piston 68, which is then retracted as far as it can go, leaves the piston 68 extended a known distance. For example the set key 36, which has only one U-shaped end 126, leaves the piston 68 extended slightly less than one inch, but that translates into a one inch displacement for the tapered end 112 on the adjusting screw 110, given the fact that the tapered end 112 jumps out of the depression 74 and onto the surrounding flat portion of the top surface 72 during this displacement (FIG. 10). Each of the compensating keys 38 have two U-shaped ends 126 and lips 128, and they hold the piston 68 less extended.

Figure 3:
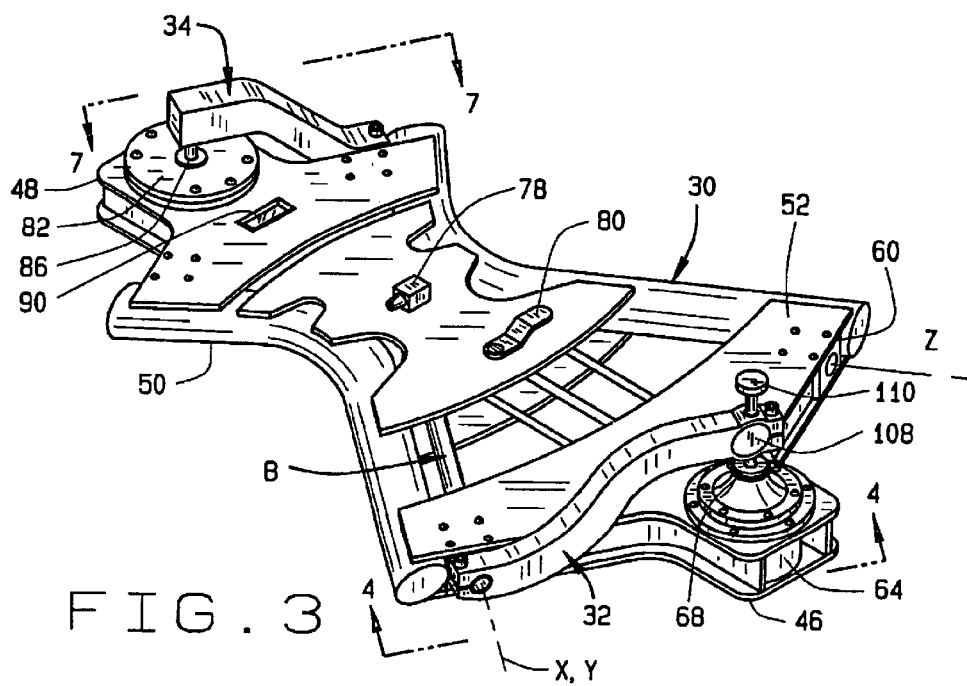
FIG. 3 is a perspective view of the rating apparatus with a torsion bar extended through it, for rating.

In use, the testing apparatus A determines the spring rate of the torsion bars B used on an automotive vehicle C, such as a sprint car. But before any bar B undergoes evaluation in the apparatus A, the apparatus A, particularly its measuring unit 82, needs to be calibrated. To this end, the calibration bar 40, which has a known spring rate determined independently of the apparatus A, is inserted (FIG. 2) through the two bushings 60 along the axis Y or the bushings 60 along the axis Z, whichever will enable the apparatus A to twist the bar 40 in the direction that led to the determination of its spring rate. The calibration bar 40 fits loosely in the bushings 60 with the splines 2 at its ends projecting beyond the bushings 60 and out of the frame 44 (FIG. 3). Its axis X coincides with the axis Y or Z, whatever may be appropriate. The internal spline 116 in the short torque arm 34 is engaged with that external spline 94 of the calibration bar 40 which projects from the tail end 48 of the frame 44. The clamp screw 120 on the short arm 34 is tightened, thereby clamping the short bar 34 securely to the calibration bar 40. The bar 40 is rotated until the nib 122 at the opposite end of the bar 40 bears against the sensing element 86 of the measuring unit 82. Thus, one end of the short torque arm 34 is supported on the calibration bar 40, while the other end is supported on the sensing element 86 of the measuring unit 82.

Figure 4:
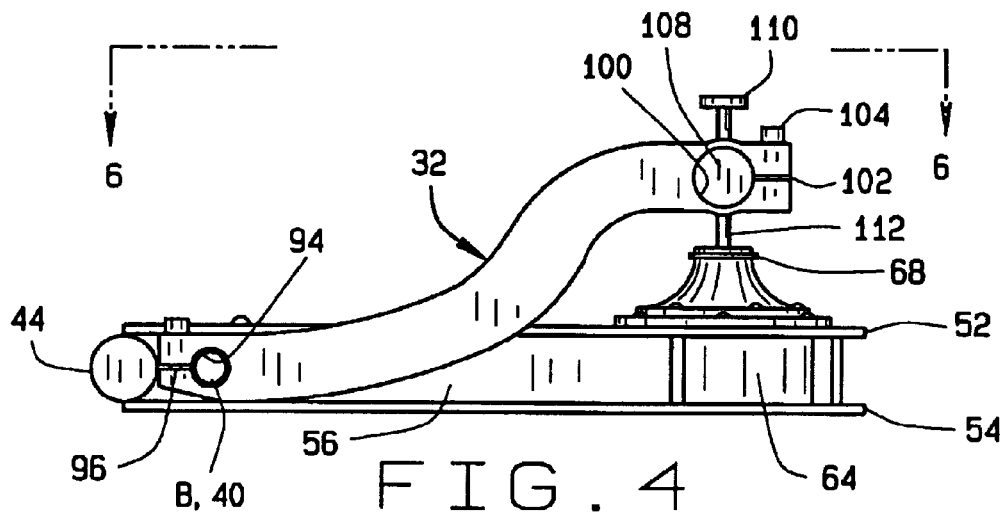
FIG. 4 is a fragmentary end elevational view of the rating apparatus taken along line 4—4 of FIG. 3.

At the head end 46 of the frame 44, the internal spline 94 on the long torque arm 32 is fitted to that spline 2 of the calibration bar 40 which exposed at the head end 46, care being taken to insure that the tapered end 112 of the adjusting screw 110 locates directly over the piston 68 of the pneumatic cylinder 64 with perhaps an inch of the screw 110 projecting out of the lower elongated opening 106. The clamp screw 98 at the spline 94 is then tightened to secure the long torque arm 32 firmly to the calibration bar 40. Then, with the clamp screw 104 at the other end of the arm 32 backed off, the adjusting screw 110 is manipulated by rotating the swivel 108 through which it threads and turning it to extend it through the swivel 108 until its tapered end 112 seats in the depression 74 that opens out of the top surface 72 of the piston 68 (FIG. 4). The clamp screw 104 is then tightened to prevent the swivel 108 from rotating.

At this juncture the valve 80 is opened and closed several times. Each time it is opened, the piston 68 of the pneumatic cylinder 64 rises and rotates the long torque arm 32 about the axis X of the bar 40. The short torque arm 34 resists the rotation, inasmuch as its nib 122 bears against the sensing element 86 on the measuring unit 82, so the bar 40 twists between its splines 2 several times. This seats the mating spline 2, 94, and 116.

Next, with the valve 80 closed, and the clamp screw 104 backed off to releases the swivel 108, the adjusting screw 110 is rotated until the display 90 reads "0". The clamp screw 104 is then tightened to secure the swivel 108 with the tapered end 112 of the adjusting screw 110 in the depression 74 of the piston 68. Thereupon, the valve 80 is opened to admit pressurized air to the barrel 66 of the pneumatic cylinder 64. The piston 68 rises in the barrel 66 and drives the adjusting screw 110 upwardly about 1¼ in. The tapered end 112 of the screw 110 moves in an arc, inasmuch as the arm 32 pivots about the axis X of the calibration bar 40, while the piston 68 translates along the axis of the cylinder 64 which is vertical and perpendicular to the plane defined by the intersecting axes Y and Z. As a consequence, the tapered end 112 leaves the depression 74 and moves onto the flat surrounding portion of the top surface 72 on the piston 68 (FIG. 8). The short torque arm 34 remains fixed in position, so the calibration bar 40 twists between the two torque arms 32 and 34. The twist, which is well within the elastic limit of the bar 40, exerts a torque on the small arm

34, and that torque translates into a force at the nib 122. The measuring unit 82 registers that force on its display 90.

With the piston 68 of the pneumatic cylinder 64 extended to its fullest extent, which is about 1¼ in., the U-shaped end 126 of the set key 36 is fitted over the side of the extended piston 68, care being exercised to insure that the lip 128 on the U-shaped end 126 enters the annular groove 70 on the piston 68. Thereupon, the valve 80 is closed to vent the barrel 66 of the cylinder 64. The torque applied to the long arm 32 drives the piston 68 back into the barrel 66 until the set key 36 bottoms out on the barrel 66 (FIG. 10). This leaves the piston 68 extended essentially one inch, which is the deflection at which the calibration bar 40 was independently rated. It also corresponds to the lesser extended position for the piston 68, that is the extension when the piston 68 is rotated to the prescribed position. The reading on the display 90 should correspond to the rating of the calibration bar 40. If it does not, the display 90 is reset. For example, if the calibration bar 40 is rated at 265 lbs. for a one-inch deflection on a 12 in. torque arm and the display 90 reads 267 lbs., the measuring unit 82 is reset so that its display 90 reads 265 lbs.

While the calibration unit 82 actually measures the pressure of the hydraulic fluid in the barrel 84 of the gauge cylinder 82, the length of the torque arms 32 and 34 and the dimensions of the barrel 84 and piston 86 are such that the pressure registered on the display 90 numerically corresponds to the force exerted by the long torque arm 32 on the extended piston 68 of the pneumatic cylinder 64.

Once the measuring unit 82 is calibrated an actual torsion bar B may be rated. The procedure is basically the same as the one used to produce a reading for the calibration bar 40. Briefly, the bar B is inserted through a pair of bushings 60 that align along the axis Y or the axis Z, depending on the direction it will twist in use. In this regard, a bar B in the bushing 60 along the axis Y will twist clockwise, whereas a bar B in the bushings 60 along the axis Z will twist counterclockwise. Then the torque arms 32 and 34 are installed on the exposed splines 2 at the ends of the bar B, and the clamp screws 98 and 120 are tightened. So too is the clamp screw 104 for the swivel 108, but only after the tapered end 112 of the adjusting screw 110 seats in the depression 74 of the piston 68. The valve 80 is opened and closed several times so that the engaged splines 2, 94 and 116 seat. Next the clamp screw 104 is backed off to free the swivel 108, and the adjusting screw 110 is turned until the display registers "0". The clamp screw 104 is now tightened to secure the swivel 108 with the tapered end 112 of the adjusting screw 110 in the depression 74 of the piston 68. Thereupon, the valve 80 is opened to energize the pneumatic cylinder 64. The piston 68 rises to its fullest extent, whereupon the set key 36 is fitted to the piston 68. The valve 80 is then closed and the piston 68 retracts under the torque exerted by the bar B until restrained by the set key 36. The force registered on the display 90 is noted and recorded against the bar B. It represents the force exerted by the piston 68 on the long torque arm 32 after the bar B has returned or "rebounded" from the 1¼ in. deflection of the torque arm 32.

With the first phase of the rating test completed, the valve 80 is opened to initiate an optional second phase. The piston 68 rises to its maximum extension of 1¼ in., whereupon the set key 36 is removed. Moreover, the valve 80 is closed, and this vents the barrel 66, causing the piston 68 to descend under the torque exerted by the bar A, to its fully retracted position. Thereupon, the piston 68 is engaged with a tool and rotated to the position in which it will extend only the prescribed amount Then the valve 80 is again opened and the piston 68 extends the prescribed amount —1 in. in this instance—which places it in the same position as it assumed in first phase when it retracted with the set key on it. The force registered on the display 90 is noted and also recorded against the bar B. Even though the bar B in the second phase underwent the same angular displacement as in the first phase, the amount of force exerted on the end of the long torque arm 32 and registered at the display 90 could well differ, with the force exerted upon rebound being less than that exerted absent the rebound. The differences in the two forces are recorded and provide another measure for comparing different torsion bars B.

Rarely are any torque arms 20 on a vehicle C 12 inches long. Usually they are longer, so the torque is applied at the greater distance from the axis X. This is where compensating keys 38, matched to the torque arms 20 of vehicles without any mathematical calculations, are used to simulate the spring rates of torsion bars B.

What is claimed is:

1. An apparatus for determining the spring rate of a torsion bar, said apparatus comprising:
   a frame having a head end and a tail end and two channels, each of which defines an axis and is configured to receive a torsion bar, the two axes being nonaligned;
   a force applicator mounted on the frame at its head end and including a drive element that is capable of undergoing a displacement from a retracted position to extended positions and exerting a force as it displaces;
   a measuring unit mounted on the frame at its tail end and being capable of measuring a force;
   a first torque arm configured to couple one end of a torsion bar in one of the channels with the drive element of the force applicator; and
   a second torque arm configured to couple with a torsion bar in one of the channels and transmit torque exerted on it to the measuring unit, so that the measuring unit can measure the force derived from the torque.

2. An apparatus according to claim 1 wherein the force applicator is located between the axes of the two channels, and the measuring unit is located between the axes of the two channels.

3. An apparatus according to claim 2 wherein the axes of the two channels cross between the head and tail ends of the frame.

4. An apparatus according to claim 3 wherein the two axes lie in essentially the same plane, and the drive element of the force applicator displaces generally perpendicular to the plane.

5. An apparatus according to claim 1 wherein the first torque arm at one end lies along the axis for the one channel and at its opposite end has a swivel and a force transfer element extended from the swivel and bearing against the drive element of the force applicator.

6. An apparatus according to claim 5 wherein the first torque arm and swivel are configured such that the swivel can be fixed in position on the first torque arm.

7. An apparatus according to claim 6 wherein the drive element has a surface against which the force transfer element of the first torque arm bears.

8. An apparatus according to claim 7 wherein the surface of the drive element contains a depression in which the end of the transfer element initially seats to establish a predetermined distance between the end of the transfer element and the axis of the channel at which said other end of the torque arm is located.

9. An apparatus according to claim 8 wherein the transfer element is an adjusting screw which threads through the swivel.

10. An apparatus according to claim 3 and further comprising first bushings at the head and tail ends of the frame and being aligned to define one of the channels; and second bushings at the head and tail ends of the frame and being aligned to define the other channel.

11. An apparatus according to claim 1 and further comprising: a key that is engageable with the drive element and, when engaged with the drive element, holds the drive element in a predetermined extended position.

12. An apparatus according to claim 11 wherein the drive element of the force applicator is capable of extending beyond the predetermined extended position, so that the key may be engaged with the drive element, whereupon the drive element will retract no farther than the predetermined extended position.

13. An apparatus according to claim 12 wherein the drive element is also capable of extending only to the predetermined extended position.

14. An apparatus for determining the spring rate of a torsion bar, said apparatus comprising:
   a frame having a channel configured to receive a torsion bar;
   a force applicator mounted on the frame and having a drive element which is offset from the channel and is capable of undergoing a displacement from a retracted position to extended positions and exerting a force as its displaces, the drive element having a drive surface that contains a depression, but is otherwise substantially flat;
   a torque arm configured to couple with the end of a torsion bar received in the channel and to extend from the bar to the drive element and having an adjusting screw, the end of which bears against the drive surface of the drive element; the adjusting screw being initially adjustable laterally with respect to the drive surface so that its end will initially seat in the depression while the drive element is in its retracted position, yet later fixed in position laterally, so that when the drive element moves to an extended position, the end of the adjusting screw will move out of the depression and into the flat position of the drive surface; and
   a measuring unit on the frame and being capable of measuring a force derived from a torque applied to a torsion bar in the channel.

15. An apparatus according to claim 14 wherein the torque arm includes a swivel which is capable of limited rotation, and the adjusting screw threads through the swivel.

16. An apparatus according to claim 15 wherein the torque arm contains a bore in which the swivel is located and the torque arm further includes a clamp screw which, when tightened, contracts the bore and fixes the position of the swivel in the torque arm.

17. In combination with a torsion bar having first and second ends, an apparatus for determining the spring rate of the torsion bar, said apparatus comprising:
   a frame having a head end and a tail end and first and second nonaligned channels extending between the head and tail ends, each channel defining an axis and being configured to receive the torsion bar, with the ends of the bar projecting out of the channels, the bar being received in one of the channels with its first end located beyond one end of the channel and its second end located beyond the other end of the channel;
   a first torque arm engaged with the first end of the torsion bar;
   a second torque arm engaged with the second end of the torsion bar;
   a measuring unit mounted on the frame at its tail end and having a sensing element against which the second torque arm bears remote from the torsion bar; and
   a force applicator mounted on the frame at the head end of the frame and including a drive element which moves between retracted and extended positions, the drive element being against the first torque arm remote from the torsion bar in a direction which is resisted by the sensing element of the measuring unit and the second torque arm, whereby the torsion bar is twisted and through the second torque arm exerts a force on the sensing element.

18. The combination according to claim 17 wherein the axes of the two channels cross between the head and tail ends of the frame.

19. The combination according to claim 17 wherein the axes lie in a common plane and the drive element moves generally perpendicular to the plane.

20. The combination according to claim 17 wherein the drive element has a drive surface that contains a depression, but is otherwise generally flat and perpendicular to the direction in which the drive element moves, and the first torque arm includes an adjusting screw having an end which bears against the drive surface of the drive element.

21. The combination according to claim 20 wherein the first torque arm includes a swivel through which the adjusting screw threads so that the screw may be moved to a position in which its end is in the depression in the drive surface of the drive element; and wherein position of the swivel is capable of being fixed in the torque arm.

22. The combination according to claim 21 wherein the first torque arm contains a bore in which the swivel is received, so that the swivel can rotate in the bore such that the end of the adjusting screw is positioned in the depression of the drive element when the drive element is retracted and a clamp screw for contracting the bore and fixing the position of the swivel in the torque arm, so that the distance between the end of the adjusting screw and the axis of the torsion bar will remain the same when the drive element moves to an extended position.

23. The combination according to claim 17 wherein the apparatus for determining the spring rate further includes a key that is engageable with the drive element and, when engaged, will maintain the drive element in a predetermined extended position.

24. The combination according to claim 23 wherein the drive element is capable of extending to and remaining at a fully extended position which is beyond the predetermined extended position and also extending to and remaining at the predetermined extended position, each without the benefit of the key.

* * * * *